Figure 1:
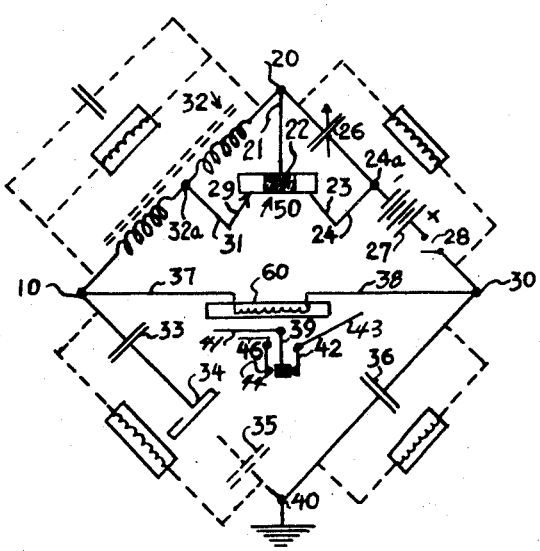

April 5, 1960　　　　　　J. PAAR　　　　　　2,931,957

IMPEDANCE BRIDGE ARRANGEMENTS

Filed Dec. 7, 1955

INVENTOR:
Joseph Paar
BY:
Michael S. Striker
agt.

United States Patent Office 2,931,957
Patented Apr. 5, 1960

2,931,957

IMPEDANCE BRIDGE ARRANGEMENTS

Josef Paar, Garmisch-Partenkirchen, Germany

Application December 7, 1955, Serial No. 551,694

Claims priority, application Germany December 9, 1954

12 Claims. (Cl. 317—153)

The present invention relates to a new and improved impedance bridge arrangement. More particularly, the present invention relates to a new and improved impedance bridge arrangement using a transistor power supply which forms an integral part of the impedance bridge.

Impedance bridge arrangements are used in many types of measuring circuits. In addition such bridge arrangements are also used as sensitive indicating devices in connection with protective circuits used with burglar alarms, fire alarms, and other types of alarm circuits. For example, when art objects and other valuable objects are displayed to the public, it is current practice to provide a capacity bridge arrangement. The capacitance to an electrical ground between the area surrounding the art object is used to balance the bridge circuit. In the event of the introduction of any foreign object within a predetermined area about the art object being protected, the capacity balance of the bridge arrangement is upset so that the bridge operates the connected alarm system. Since almost any foreign object upsets the capacity balance of the bridge, it can be seen that such a capacity bridge arrangement provides a very sensitive protective circuit for valuable objects.

In such conventional capacity and impedance bridge arrangements, a power supply is used which includes the usual vacuum tubes arranged in an oscillator circuit together with an amplifier for providing sufficient energization for the bridge circuit. In the detector portion of the bridge additional vacuum tubes are used for operating a mechanical relay which controls the alarm circuit. For example, the mechanical relay may be operated by the conventional thyratron circuits.

It is clear that in order to provide the required filament current and anode current for the various vacuum tubes in the oscillator and detector circuits of the impedance bridge arrangement, a substantial power supply is required. If the protective circuit arrangement is to be portable it is sometimes necessary to provide a vibrator circuit which converts the direct current of the battery supply circuits into an alternating current for use with the various vacuum tubes in the power supply.

For the above reasons the protective circuits have been quite expensive and accordingly only the most valuable art objects have made use of such circuits. On the other hand, with the present invention it is possible to produce a sensitive impedance bridge arrangement for protective circuits which are relatively inexpensive to construct and which require very little maintenance or operating power.

It is accordingly one of the objects of the present invention to provide a new and improved impedance bridge arrangement which overcomes the disadvantages described hereinabove.

A second object of the present invention is to provide a new and improved impedance bridge arrangement which includes a power supply circuit that is integral with the impedance bridge itself.

Still another object of the present invention is to provide a new and improved portable impedance bridge arrangement.

A further object of the present invention is to provide an impedance bridge arrangement using a self-excited oscillator circuit for the power supply of the impedance bridge.

Still a further object of the present invention is to provide a self-excited oscillator circuit using a transistor for use as a power supply for an impedance bridge arrangement.

Yet another object of the present invention is to provide a new and improved impedance bridge arrangement wherein the detector circuit is a mechanical relay and can be operated directly from the unbalanced current of the bridge arrangement.

With the above objects in view the present invention mainly consists of a power supply for an impedance bridge arrangement having a plurality of bridge arms and including a frequency determining element connected in at least one of the bridge arms of the impedance bridge, at least one transistor connected to the frequency determining element to form a self-excited frequency generator, therewith, and means for energizing the thus-formed frequency generator whereby the frequency generator operates as a power supply for the impedance bridge arrangement while simultaneously forming an integral part of the impedance bridge arrangement.

In another embodiment the present invention includes an impedance bridge arrangement having a plurality of bridge arms and bridge terminals and having a frequency determining element connected in at least one of the bridge arms of the impedance bridge, at least one transistor connected to the frequency determining element to form a self-excited frequency generator therewith, means for energizing the thus-formed frequency generator whereby the frequency generator operates as a power supply for the impedance bridge arrangement while simultaneously forming an integral part of the impedance bridge arrangement, electrical circuit means connected in another of the bridge arms of the bridge and having predetermined electrical characteristics, means connected in still another of the bridge arms of the bridge for maintaining the impedance bridge in a predetermined condition when the electrical circuit means exhibits said predetermined characteristics, the bridge being in a different condition when the electrical circuit means exhibits other than said predetermined characteristics, and a detector connected between opposite bridge terminals, the terminals having identical electrical potentials applied thereto when the bridge is in said predetermined condition, the opposite terminals having a difference of potential therebetween when the bridge is in said different condition.

Figure 2:
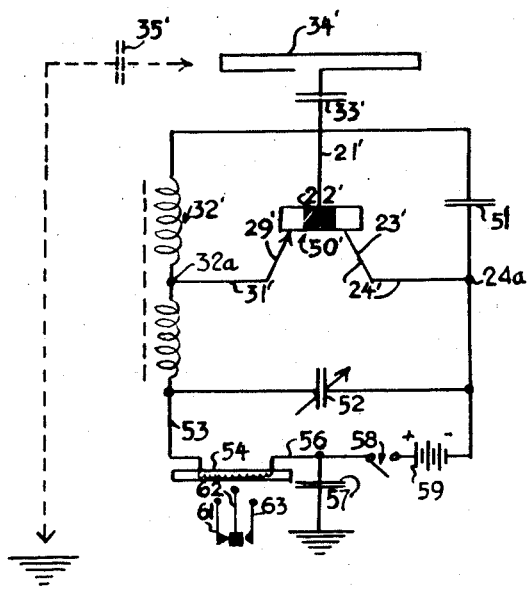

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an electrical schematic diagram of one embodiment of the present invention; and Fig. 2 is an electrical schematic diagram of a second embodiment of the present invention.

Referring to the drawings and more particularly to Fig. 1, an impedance bridge arrangement is shown having four terminals 10, 20, 30 and 40 respectively. It can be seen that the terminal 40 is connected to an electrical ground.

Connected to the terminal 20 by a conductor 21 is the base electrode 22 of a transistor 50. The transistor 50 also has a collector electrode 23 connected by a conductor 24 to one side of a variable capacitor 26 and to the negative terminal of a source of direct current potential 27. The other side of the variable capacitor 26 is connected to the terminal 20 and the positive terminal of the source 27 is connected through the normally open switch 28 to the terminal 30 of the impedance bridge.

The transistor 50 also has an emitter electrode 29 which is connected by a conductor 31 to the mid point of a frequency determining element 32. The frequency determining element 32 consists of an inductance element connected between the terminals 10 and 20 of the impedance bridge arrangement and forming one of the bridge arms thereof. The inductance 32 consists of two separate inductive elements and is illustrated as having a magnetic core.

Connected between the terminals 10 and 40 of the impedance bridge arrangement and forming still another bridge arm thereof, is the electrical equivalent elements which correspond to the object being protected. This includes a blocking capacitor 33 having one of its sides connected to the terminal 10 and the other of its sides connected to an equivalent antenna 34. The antenna 34 represents the outer surface of the object whose protection is provided for by the impedance bridge arrangement. Between the surface of the object, represented by the antenna 34, and ground is an effective capacitance which can be represented by the capacitor 35 shown in dotted lines. The capacitor 35 is shown in dotted lines because it is not an actual condensor or capacitor but is actually the stray capacitance between the surface of the object and ground.

The fourth and last bridge arm of the illustrated bridge arrangement is shown between the terminals 30 and 40 and consists of a capacitor 36. In addition to the various elements shown in the plurality of bridge arms of the impedance bridge arrangement of Fig. 1, there are also illustrated several stray capacitances and impedances. These stray capacitances and impedances are shown connected by conductors that are dotted to indicate that they are not actual conductors or additional capacitors and impedances. The impedances primarily consist of the effective alternating current resistances since the bridge is used as an alternating current bridge.

The detecting portion of the impedance bridge arrangement in Fig. 1 is shown connected between the terminals 10 and 30 and includes a relay 60 having a relay winding connected by a conductor 37 to the terminal 10 and a conductor 38 to the terminal 30. The relay 60 has a movable armature 39 connected to a conductor 41. The armature 39, in the normally unenergized condition of the relay 60, is shown connected to the normally closed contact 42 of the relay. The contact 42 is connected to a conductor 43. The relay 60 also includes at least one normally open contact 44 connected to a conductor 46. It can be seen that when the relay 60 is energized it will attract the armature 39 thereto to break the connection between the armature 39 and the contact 42 and to make a connection between the armature 39 and the contact 44.

In operation, when the switch 28 is closed the potential of the direct current source 27 is applied between the various electrodes of the transistor 50. Due to the self-capacitance and self-resistance of the transistor 50, a tuned circuit is established with the inductance 32 to produce a self-excited frequency generator. That is, the transistor 50 in combination with the frequency determining element 32 forms a frequency tuned circuit which is capable of oscillating at a frequency determined by the magnitude of the various elements thereof. This self-excited frequency generator provides the necessary A.C. power for operating the impedance bridge arrangement and this power is provided even though the transistor 50 and the frequency determining element 32 are integral portions of the impedance bridge arrangement.

When the A.C. impedance bridge is in stabilized condition, this condition continues as long as the stray capacitance 35 between the surface 34 of the object and electrical ground remains at its predetermined constant value. However, in the event of an introduction of a foreign object between the surface 34 of the object under protection and ground, the capacitance between the object and ground will be increased and thereby change the distribution of impedance in the bridge circuit.

When the condition of the A.C. impedance bridge is thus changed the flow of D.C. current through the plurality of bridge arms is such that a difference of D.C. potential is created between the terminals 10 and 30. This difference of potential is applied to the relay winding of the relay 60 to energize the relay 60 and cause the same to attract its armature 39 thereto. This will disconnect the armature 39 and its conductor 41 from the contact 42 and will connect the same to the contact 44. Accordingly, the conductor 41 will be directly connected to the conductor 46. It is apparent that these conductors can form part of an alarm system to set off the alarm either at the place where the object 34 is located, at some remote location therefrom or at both such locations.

The capacitance of the variable capacitor 26 may be varied in order to provide the desired condition of the impedance bridge arrangement. Also, it is apparent that the magnitudes of the bridge elements may be chosen so that the transistor will operate near its cut-off point. Accordingly, an ordinary flash light battery may be used to power the entire impedance bridge arrangement. It has been found that with such an arrangement one flashlight battery is sufficient to provide energization for the impedance bridge arrangement illustrated for a period of six months.

It is also apparent that the above arrangement is completely independent of any external power source. Therefore it does not require any rectification of the alternating current voltage supplied from the power source. The present invention therefore does away with any rectifiers, vibrators, transformers and filtering condensers and inductances.

In the event that the voltage of the direct current source 27 decreases to lower the sensitivity of the apparatus, the capacitor 26 may be varied to easily overcome the loss of voltage.

In the embodiment of Fig. 1 the transistor current of the emitter and collector electrodes increases when the foreign object comes within the vicinity of the surface 34 of the object being protected. That is, the introduction of the additional capacitance by the foreign object results in the raising of the total capacitance between the surface 34 and ground potential. This raising of the capacitance causes a change of the condition of the bridge.

It has been found that satisfactory operation of an apparatus according to the invention is obtained if the essential components are chosen as follows:

| | |
|---|---|
| Transistor 50 | Type OC 602. |
| Inductance 32, 32' | Generator coil, wound for 25 kilocycles, with centered tap and magnetostrictive ferrite core. |
| Condenser 26, 52 | Rotary type variable condenser, rated 250 micro-microfarad. |
| Relay 54, 60 | High sensitivity micro-relay, polarized type, with coil of 6000 ohms. |
| Source 27, 59 | Battery 4.5 volts. |
| Condensers 33, 33', 36, 51 | 5000 micro-microfarad. |

Referring now to Fig. 2 an embodiment will be described wherein the transistor current will decrease when the capacitance between the object and ground potential is increased. In Fig. 2 it can be seen that the emitter 29' of the transistor 50' is again connected by the conductor 31' to the electrical mid point of a frequency determining inductance 32'. The base electrode 22' of the transistor 50' is connected by a conductor 21' to one side of a blocking capacitor 33', the other side of which is connected to the surface 34' of the object being protected. As before, the surface 34' of the object is illustrated as being in the form of an antenna which has a capacitance to ground indicated by the dotted capacitance 35'.

The base electrode 22' is also connected to one side of a capacitor 51 the other side of which is connected to the collector electrode 23' by means of a conductor 24'. The collector 23' is also connected to one side of a variable capacitor 52, the other side of which is connected to one end of the frequency determining inductance 32'. Connected to this same end of the frequency determining inductance 32' is a conductor 53 which is connected to one side of the relay winding of the relay 54. The other side of the relay winding of the relay 54 is connected by means of a conductor 56 to one side of a capacitor 57 the other side of which is grounded. This other end of the relay winding of the relay 54 is also connected by the conductor 56 through a normally open switch 58 to the positive terminal of a source 59 of direct current of protection. The negative terminal of the source 59 is connected to the collector electrode 23' of the transistor 50'. As before, the relay 54 has a normally closed contact 61, an armature 62 and a normally open contact 63.

In operation, when the bridge is in stabilized condition through the capacitance 35' between the surface 34' of the object to be protected and ground, no voltage is applied across the relay windings of the relay 54. However, when a foreign object is introduced in the vicinity of the object whose surface 34' is to be protected, the capacitance 35' is raised and thereby the condition of the bridge is changed. In this case the current of the transistor 50' decreases with the raising of the capacitance 35'. It is clear that the transistor 50' again operates as a frequency generator and that its self-capacitance and self-resistance cooperate with the inductance 32' to provide an A.C. voltage at the predetermined frequencies depending on the physical constants of the transistor and the value of the inductance 32'.

When the bridge condition is thus changed the resulting D.C. voltage is applied across the relay winding of the relay 54 which attracts its armature 62. This opens the circuit of the contact 61 and closes the circuit of the contact 63. Any desirable alarm circuit may be operated by the relay 54.

The present invention has been described with an impedance bridge arrangement which operates with a change of capacity. However, the term impedance bridge arrangement is meant to include any type of bridge arrangement the condition of which can be changed depending upon changes in resistance, capacitance, or inductance or any combination of the same. For example, objects which are made out of magnetizable material such as iron can be protected by the magnetic field set up around the object and between the object and ground.

The stability of the apparatus incorporating the principles of the present invention may be very high since the capacitors, resistors and such can be made from temperature, current and voltage independent materials. This will stabilize the values of these elements. Also, instead of the inductance in the bridge circuit, a crystal can be used whose physical constants will be more highly stable than the inductance as a frequency determining element.

In place of the relays 60 and 54 it is apparent that a transistor-operated relay or a transistor-thyratron operated measuring instrument may be used. Also, earphones may be provided as well as any other detectors which are well known in the art. It is also possible to use several different transistors in parallel rather than one transistor for the self-excited frequency generator.

It will be understood that each of the elements described above, or two or more together, may also find a useful application in other types of bridge arrangements differing from the types described above.

While the invention has been illustrated and described as embodied in an impedance bridge arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an impedance bridge arrangement having a plurality of bridge arms, in combination, a frequency determining element connected in at least one of the bridge arms of said impedance bridge; at least one transistor having a plurality of electrodes, two of said electrodes being connected to said frequency determining element to form a self-excited frequency generator therewith; a D.C. voltage source connected in another one of said bridge arms for energizing said thus-formed frequency generator whereby said frequency generator operates as an A.C. power supply for said impedance bridge arrangement while simultaneously forming an integral part of said impedance bridge arrangement; and a variable impedance element connected in one arm of said impedance bridge and between two of said transistor electrodes, the impedance of said variable impedance element determining the operative condition of said impedance bridge arrangement.

2. In an impedance bridge arrangement having a plurality of bridge arms, in combination, at least one transistor having a plurality of electrodes and having self-capacitance and self-resistance between said electrodes thereof; a frequency determining element connected in at least one of the bridge arms of said impedance bridge and connected to two electrodes of said transistor so that said self-capacitance and self-resistance of said transistor forms a frequency tuned circuit therewith and said transistor forms part of a self-excited frequency generator including said frequency tuned circuit; a D.C. voltage source connected in another one of said bridge arms for energizing said thus-formed frequency generator whereby said frequency generator operates as an A.C. power supply for said impedance bridge arrangement while simultaneously forming an integral part thereof; and a variable impedance element connected in one arm of said impedance bridge and between two of said transistor electrodes, the impedance of said variable impedance element determining the operative condition of said impedance bridge arrangement.

3. In an impedance bridge arrangement having a plurality of bridge arms, in combination, a frequency determining element connected in at least one of the bridge arms of said impedance bridge; at least one transistor having a plurality of electrodes, two of said electrodes being connected to said frequency determining element to form a self-excited frequency generator therewith; a D.C. voltage source connected in another one of said bridge arms for energizing said thus-formed frequency generator whereby said frequency generator operates as an A.C. power supply for said impedance bridge arrangement while simultaneously forming an integral part of said impedance bridge arrangement; and a variable capacitor connected in one arm of said impedance bridge and between two of said transistor electrodes, the capacitance of said variable capacitor determining the operative condition of said impedance bridge arrangement.

4. In an impedance bridge arrangement having a plurality of bridge arms and bridge terminals, in combination, a frequency determining element connected in at least one of the bridge arms of said impedance bridge; at least one transistor connected to said frequency determining element to form a self-excited frequency generator therewith; a D.C. voltage source connected in another one of said bridge arms for energizing said thus-formed frequency generator whereby said frequency generator operates as an A.C. power supply for said impedance bridge arrangement while simultaneously forming an integral part of said impedance bridge arrangement; electrical circuit means connected in another of said bridge arms of said bridge and having predetermined electrical characteristics; means connected in still another of said bridge arms of said bridge for maintaining said impedance bridge in a predetermined operative condition when said electrical circuit means exhibits said predetermined characteristics, said bridge being in a different operative condition when said electrical circuit means exhibits other than said predetermined characteristics; and a detector means capable of being changed between operative and non-operative conditions and connected between opposite bridge terminals, said terminals having a predetermined D.C. potential applied thereto when said bridge is in said predetermined operative condition, said opposite terminals having a different D.C. potential therebetween when said bridge is in said different operative condition, said predetermined and said different D.C. potentials alternatively causing said detector means to be in one and the other of said conditions, respectively.

5. In an impedance bridge arrangement having a plurality of bridge arms and bridge terminals, in combination, at least one transistor having a plurality of electrodes and having self-capacitance and self-resistance between said electrodes thereof; a frequency determining element connected in at least one of the bridge arms of said impedance bridge and connected to two electrodes of said transistor so that said self-capacitance and self-resistance of said transistor forms a frequency tuned circuit therewith and said transistor forms part of a self-excited frequency generator including said frequency tuned circuit; a D.C. voltage source connected in another one of said bridge arms for energizing said thus-formed frequency generator whereby said frequency generator operates as an A.C. power supply for said impedance bridge arrangement while simultaneously forming an integral part thereof; electrical circuit means connected in another of said bridge arms of said bridge and having predetermined electrical characteristics; means connected in still another of said bridge arms of said bridge for maintaining said impedance bridge in a predetermined operative condition when said electrical circuit means exhibits said predetermined characteristics, said bridge being in a different operative condition when said electrical circuit means exhibits other than said predetermined characteristics; and a detector means capable of being changed between operative and non-operative conditions and connected between opposite bridge terminals, said terminals having a predetermined D.C. potential applied thereto when said bridge is in said predetermined operative condition, said opposite terminals having a different D.C. potential therebetween when said bridge is in said different operative condition, said predetermined and said different D.C. potentials alternatively causing said detector means to be in one and the other of said conditions, respectively.

6. In an impedance bridge arrangement having a plurality of bridge arms, in combination, at least one transistor having a base electrode, emitter electrode and a collector electrode and having self-capacitance and self-resistance between said electrodes thereof; a frequency determining element connected in at least one of the bridge arms of said impedance bridge and connected between said base and emitter electrodes of said transistor so that said self-capacitance and self-resistance of said transistor forms a frequency tuned circuit therewith and said transistor forms part of a self-excited frequency generator including said frequency tuned circuit; a D.C. voltage source connected in another one of said bridge arms for energizing said thus-formed frequency generator whereby said frequency generator operates as an A.C. power supply for said impedance bridge arrangement while simultaneously forming an integral part thereof; and a variable impedance element connected in one arm of said impedance bridge and between said collector and base electrodes of said transistor, the impedance of said variable impedance element determining the operative condition of said impedance bridge arrangement.

7. In an impedance bridge arrangement having a plurality of bridge arms, in combination, at least one transistor having a plurality of electrodes and having self-capacitance and self-resistance between said electrodes thereof; a frequency determining element connected in at least one of the bridge arms of said impedance bridge and connected to two electrodes of said transistor so that said self-capacitance and self-resistance of said transistor forms a frequency tuned circuit therewith and said transistor forms part of a self-excited frequency generator including said frequency tuned circuit; a D.C. voltage source connected in another one of said bridge arms for energizing said thus-formed frequency generator whereby said frequency generator operates as an A.C. power supply for said impedance bridge arrangement while simultaneously forming an integral part thereof; and a variable capacitor connected in one arm of said impedance bridge and between two of said transistor electrodes, the capacitance of said variable capacitor determining the operative condition of said impedance bridge arrangement.

8. In an impedance bridge arrangement having a plurality of bridge arms and bridge terminals, in combination, a frequency determining element connected in at least one of the bridge arms of said impedance bridge; at least one transistor having a plurality of electrodes, two of said electrodes being connected to said frequency determining element to form a self-excited frequency generator therewith; a D.C. voltage source connected in another one of said bridge arms for energizing said thus-formed frequency generator whereby said frequency generator operates as an A.C. power supply for said impedance bridge arrangement while simultaneously forming an integral part of said impedance bridge arrangement; a variable impedance element connected in another arm of said impedance bridge and between at least two of said transistor electrodes, the impedance of said variable impedance element determining the operative condition of said impedance bridge arrangement; electrical circuit means connected in another of said bridge arms of said bridge and having predetermined electrical characteristics; means connected in still another of said bridge arms of said bridge for maintaining said impedance bridge in a predetermined operative condition when said electrical circuit means exhibits said predetermined characteristics, said bridge being in a different operative condition when said electrical circuit means exhibits other than said predetermined characteristics; and a detector means capable of being changed between operative and non-operative conditions and connected between opposite bridge terminals, said terminals having a predetermined D.C. potential applied thereto when said bridge is in said predetermined operative condition, said opposite terminals having a different D.C. potential therebetween when said bridge is in said different operative condition, said predetermined and said different D.C. potentials alternatively causing said detector means to be in one and the other of said conditions, respectively.

9. In a capacity bridge arrangement having a plurality of bridge arms, in combination, a frequency determining element connected in at least one of the bridge arms of said capacity bridge; at least one transistor having a plurality of electrodes, two of said electrodes being connected to said frequency determining element to form a self-excited frequency generator therewith; a D.C. voltage source connected in another one of said bridge arms for energizing said thus-formed frequency generator whereby said frequency generator operates as an A.C. power supply for said capacity bridge arrangement while simultaneously forming an integral part of said capacity bridge arrangement; and a variable capacitor connected in one arm of said impedance bridge and between two of said transistor electrodes, the capacitance of said variable capacitor determining the operative condition of said impedance bridge arrangement.

10. In an impedance bridge arrangement having a plurality of bridge arms and bridge terminals, in combination, a frequency determining element connected in at least one of the bridge arms of said impedance bridge; at least one transistor connected to said frequency determining element to form a self-excited frequency generator therewith; a D.C. voltage source connected in another one of said bridge arms for energizing said thus-formed frequency generator whereby said frequency generator operates as an A.C. power supply for said impedance bridge arrangement while simultaneously forming an integral part of said impedance bridge arrangement; electrical circuit means connected in another of said bridge arms of said bridge and having predetermined electrical characteristics; means connected in still another of said bridge arms of said bridge for maintaining said impedance bridge in a predetermined operative condition when said electrical circuit means exhibits said predetermined characteristics, said bridge being in a different operative condition when said electrical circuit means exhibits other than said predetermined characteristics; and detector means comprising a relay means capable of being changed between operative and non-operative conditions and having a relay winding connected between opposite bridge terminals, said terminals having a predetermined D.C. potential applied thereto when said bridge is in said predetermined operative condition, said opposite terminals having a different D.C. potential therebetween when said bridge is in said different operative condition, said predetermined and said different D.C. potentials alternatively causing said detector means to be in one and the other of said conditions, respectively.

11. In an impedance bridge arrangement having a plurality of bridge arms and bridge terminals, in combination, a frequency determining element connected in at least one of the bridge arms of said impedance bridge; at least one transistor connected to said frequency determining element to form a self-excited frequency generator therewith; a D.C. voltage source connected in another one of said bridge arms for energizing said thus-formed frequency generator whereby said frequency generator operates as an A.C. power supply for said impedance bridge arrangement while simultaneously forming an integral part of said impedance bridge arrangement; electrical circuit means connected in another of said bridge arms of said bridge and having a predetermined electrical capacitance; means connected in still another of said bridge arms of said bridge for maintaining said impedance bridge in a predetermined operative condition when said electrical circuit means exhibits said predetermined capacitance, said bridge being in a different operative condition when said electrical circuit means exhibits other than said predetermined capacitance; and a detector means capable of being changed between operative and non-operative conditions and connected between opposite bridge terminals, said terminals having a predetermined D.C. potential applied thereto when said bridge is in said predetermined operative condition, said opposite terminals having a different D.C. potential therebetween when said bridge is in said different operative condition, said predetermined and said different D.C. potentials alternatively causing said detector means to be in one and the other of said conditions, respectively.

12. In an impedance bridge arrangement having a plurality of bridge arms, in combination, at least one transistor having a base electrode, emitter electrode and a collector electrode and having self-capacitance and self-resistance between said electrodes thereof; a frequency determining element connected in at least one of the bridge arms of said impedance bridge and connected between said base and emitter electrodes of said transistor so that said self-capacitance and self-resistance of said transistor forms a frequency tuned circuit therewith and said transistor forms part of a self-excited frequency generator including said frequency tuned circuit; a D.C. voltage source connected in another one of said bridge arms for energizing said thus-formed frequency generator whereby said frequency generator operates as an A.C. power supply for said impedance bridge arrangement while simultaneously forming an integral part thereof; and a variable impedance element connected in one arm of said impedance bridge and between said collector and emitter electrodes of said transistor, the impedance of said variable impedance element determining the operative condition of said impedance bridge arrangement.

References Cited in the file of this patent

UNITED STATES PATENTS

| | | |
|---|---|---|
| 2,673,340 | Johansson et al. | Mar. 23, 1954 |
| 2,773,219 | Aron | Dec. 4, 1956 |